(12) United States Patent
Marta

(10) Patent No.: US 11,002,299 B1
(45) Date of Patent: May 11, 2021

(54) PRESSURE WAVE GENERATOR WITH DYNAMIC REFLECTOR OF PRESSURE IMPULSE

(71) Applicant: Ion Marta, Philadelphia, PA (US)

(72) Inventor: Ion Marta, Philadelphia, PA (US)

(73) Assignee: ABI Energy Ltd. Israel, Netanya (IL)

( * ) Notice: Subject to any disclaimer, the term of this patent is extended or adjusted under 35 U.S.C. 154(b) by 0 days.

(21) Appl. No.: 16/878,125

(22) Filed: May 19, 2020

(51) Int. Cl.
F15B 21/12 (2006.01)
B65G 53/66 (2006.01)

(52) U.S. Cl.
CPC ............ *F15B 21/125* (2013.01); *B65G 53/66* (2013.01)

(58) Field of Classification Search
None
See application file for complete search history.

(56) References Cited

U.S. PATENT DOCUMENTS

| | | | | |
|---|---|---|---|---|
| 6,827,528 | B1 * | 12/2004 | Relin | B65G 23/00 406/106 |
| 7,556,455 | B2 * | 7/2009 | Relin | B65G 23/00 406/12 |
| 8,573,896 | B2 * | 11/2013 | Relin | F04B 35/04 406/197 |
| 10,233,952 | B1 * | 3/2019 | Marta | F17D 1/20 |
| 10,627,108 | B2 * | 4/2020 | Baquet | F23J 7/00 |

OTHER PUBLICATIONS

Takehiko Segava, et al. Turbulent drag reduction by means of alternating suction and blowing jets. Fluid Dynamic Research. 39 (2007) 552-568.
Turgut Sarpkaya. Coherent structures in oscillatory boundary layer. Journal of Fluid Mechanics. 1993, vol. 253, pp. 105-140.
S.W. Tu, B. R. Ramaprian. Fully developed periodic turbulent pipe flow. Part 1. Main experimental results and comparison with predictions. Journal of Fluid Mechanics. 1983, vol. 137, pp. 31-58.
B. R. Ramaprian, S.W. Tu, Fully developed periodic turbulent pipe flow. Part 2. The detailed structure of the flow. Journal of Fluid Mechanics. 1983, vol. 137, pp. 59-81.

(Continued)

*Primary Examiner* — William R Harp
(74) *Attorney, Agent, or Firm* — Dennemeyer & Associates, LLC

(57) ABSTRACT

A pressure wave generator with dynamic reflector of pressure impulse is disclosed which comprises an outer fixed and an inner coaxially-rotating cylindrical elements with the given profiled openings of the given shapes and sizes in the solid walls and a dynamic reflector of pressure impulse, configured in the solid wall of the inner rotating cylindrical element having a longitudinal radial-azimuthal variable-concave surface. Such concave surface provides a decomposition of the reflected pressure impulse to a radial and azimuthal component, especially important on the stage of decrease of the pressure amplitude from a maximal value to zero. Variation of the curvature of the radial-azimuthal shape of the concave surface provides a maximal azimuthal component and a minimal radial component of the mechanical reaction of the shaft of the pressure wave generator. The helicoidally-shape of the inner surface of a collector add an azimuthal motion to reflected pressure impulse.

4 Claims, 6 Drawing Sheets

(56) References Cited

OTHER PUBLICATIONS

E.B. Shuy. Wall shear stress in accelerating and decelerating turbulent pipe flows. Journal of Hydraulic Research. vol. 34, 1996—Issue 2.
N. Kingery, et al. Technical Report ARBRL-TR-02537. Reflected overpressure impulse on a finite structure. Ballistic Research Laboratory. Dec. 1983.

* cited by examiner

PRESSURE WAVE GENERATOR WITH DYNAMIC REFLECTOR OF PRESSURE IMPULSE

TECHNICAL FIELD

The present invention relates to a generator of pressure waves, which provides the generating pressure waves in fluids and fluid flows. It can be used to increase the energy efficiency for transportation of flowable media through pipelines: as examples of such flow, one-phase and multi-phase fluids, homogeneous and heterogeneous media, powders, disperse mixtures; forced filtration, extraction of liquids from capillary porous saturated media; heat and mass transfer.

BACKGROUND OF THE INVENTION

The present invention relates to a pressure wave generator with a dynamic reflector of pressure impulse. The use of pressure waves with various amplitudes, frequencies and waveforms is increasingly applied in scientific laboratory research and in various technological processes. Correspondingly, the different generators are used for generating pressure perturbations of relatively small amplitudes and for generating pressure waves of relatively large amplitudes.

Generating symmetrical sinusoidal pressure waves, even of small amplitudes, for simple laboratory research is carried out by very complicated separate hydraulic system, using a piston and controlled drive as shown in the following papers: Takehiko Segava, et al. *Turbulent drag reduction by means of alternating suction and blowing jets*, Fluid Dynamic Research. 39 (2007) 552-568; Turgut Sarpkaya, *Coherent structures in oscillatory boundary layer*, Journal of Fluid Mechanics. 1993, vol. 253, pp. 105-140, S. W. Tu, B. R. Ramaprian, *Fully developed periodic turbulent pipe flow: Part 1. Main experimental results and comparison with predictions,* Journal of Fluid Mechanics. 1983, vol. 137, pp. 31-58, B. R. Ramaprian, S. W. Tu, *Fully developed periodic turbulent pipe flow; Part 2 and The detailed structure of the flow*, Journal of Fluid Mechanics. 1983, vol. 137, pp. 59-81.

To operate such a system, generated wave energy is introduced in the pipe fluid flow. Further, for example, the phenomena of interaction between wave energy and turbulence of the flow along the pipeline is studied, forming coherent structures, suppression of turbulence, relaminarization, and others.

Even if parameters of generated waves can improve some industrial technological processes, these generators are very complicated and cannot be applied in industries. Moreover, these generators are generally designed to generate only symmetrical sinusoidal perturbations and pressure waves.

One more simple method of generating pressure waves was proposed by A. Relin [1. U.S. Pat. No. 6,827,528. 2004], which is based on the periodic connection of fluid zones with different pressures, creating by a pump and realized by a separated unit, modulator.

Generating any kind of symmetrical or asymmetrical pressure waves or perturbations of any frequencies, amplitudes and waveforms such as disclosed in [2. I. Marta, U.S. Pat. No. 10,233,952. 2019], which is based on the exchange of pressure impulse, between two fluid zones with different pressures through the periodic changing of the given common surface, obtained as a result of the intersecting of the single position location of the profiled surfaces of cross-sectional openings in the solid walls of concentric cylindrical elements during rotation of the inner cylindrical element relatively to outer cylindrical element. Generated pressure waves by this method cover a whole range of amplitudes, frequencies and waveforms needed for the laboratory research and technological processes. The periodic process of the exchange of pressure impulse is accompanied by forming simultaneously two pressure waves on the common surface: compression pressure wave, $p^+$ propagating in the fluid zone with under pressure and rarefaction pressure wave, $p^-$ propagating in the fluid zone with overpressure. Both generated waves have the same frequency, waveform and absolute value of amplitude, relatively to average values of under pressure and overpressure in the fluid zone.

The process of generating pressure waves consists of forming waves during two-time intervals, constituting a period: a front time, $t_F$ and a back time, $t_B$, where $t_B=T-t_F$, and T is a period. During the front time, $t_F$ the common surface is increasing from zero to a maximum, while a pressure in the rarefaction wave is decreased to the amplitude value $p^-$, relatively to the value of the overpressure in the fluid zone. Simultaneously, a pressure in a compression wave, during a front time, $t_F$ is increased to the amplitude value, $p^+$ relatively to the value of the under pressure in the fluid zone.

The waves $p^+$ and $p^-$ are formed only due to the exchange of pressure impulse between fluid zones, through the common surface during the front time, $t_F$. Recovery of pressure to zero, in the waves $p^+$ and $p^-$ during the back time, $t_B$, is carried out differently. Such recovery of pressure in the compression wave is formed only due to the exchange of pressure impulse through the common surface. While the recovering pressure in the rarefaction wave is carried out due to the exchange of pressure impulse through the common surface and reflected pressure impulse from the outer cylindrical surface of the rotating inner movable cylindrical solid wall.

Estimation of the components of the exchanged and reflected pressure impulse has not been made, as noted by A. Relin, and I. Marta, [1, 2. U.S. Pat. No. 8,573,896, 2013 and I. Marta, U.S. Pat. No. 10,233,952, 2019]. These patents disclose the energetical principle and principle of profiling surface of cross-sectional openings of elements of mechanical system for generating any symmetrical or asymmetrical pressure waves in fluids. The basic idea of U.S. Pat. Nos. 10,233,952 and 8,573,896 is the developing of the method of dynamic energy action applying to a carrying medium flow for performing a process of transporting of the object. Particular attention is paid to steps of energy transformation, during the transporting process. The inventors of US Patent [2, 1. U.S. Pat. Nos. 10,233,952 and 8,573,896], at the time of the discovery of the present invention, continue developing the idea originally proposed in US Patent [1. U.S. Pat. No. 8,573,896]. The engineering research is now being applied to the drop-shaped form of the law of negative modulation, for pipeline transportation of fluid media. Also, it has been determined that the modulated medium flow energy optimizing criteria, which allows continuously keeping a minimal energy consumption vs amplitude, frequency and waveform of negative modulation, during pipeline transporting process of medium flow.

Estimations of the above-mentioned components have to be done for a better understanding of the mechanical actions of pressure impulse components on the elements of pressure wave generator and for providing its stability during operating.

The development of the pressure wave generator, disclosed in US Patents [U.S. Pat. Nos. 6,827,528, 8,573,896 and 10,233,952], is connected in parallel to a pump with the suction and discharge pipes. The under and over pressures correspond to the suction and discharge pressures on the pump. Analysis of the formation and propagating pressure perturbations or pressure waves through the fluid flows along the suction and discharge pipe is presented, in U.S. Pat. Nos. 10,233,952, 8,573,896 and 6,827,528 and the papers noted above and mechanisms of forming pressure waves, in order to show the difference of generator designs. The developed pressure wave generators disclosed in U.S. Pat. Nos. 6,827,528, 8,573,896 and 10,233,952 cover the broad specter of technological and laboratory applications.

The results of focused studies, of perturbated turbulent flows to decrease the hydrodynamic resistance and save energy, are very important for practical applications. They show that the energy of symmetric and asymmetric waves is the most suitable form of energy for influencing a turbulent flow with the aim of significantly changing hydrodynamic resistance.

Therefore, the present invention improves the design of the pressure wave generators to ensure the stability of operating and wider application in various technologies. The studies of pulsating flows in recent decades, are related to actions of symmetric perturbations of pressure and velocity of turbulent flows in the pipes, as well as with the perturbation of flow energy. Basically, the pulsating flows are targeted to decrease hydrodynamic resistance of transporting medium flow through pipelines and gives encouraging results.

As a result of actions of symmetrical perturbations of the turbulent flows, a variety of physical effects are brought out: changing stability of the boundary layer and the wall shear stress; forming the ordered and coherent structures; inhibition of turbulence; suppression of turbulence; and partial relaminarization among others.

It has been experimentally shown that during the acceleration phase and recovery of the pressure in the wave, friction decreases as shown by E. B. Shuy, *Wall Shear Stress in Accelerating and Decelerating Turbulent Pipe Flows*, Journal of Hydraulic Research. Vol. 34, 1996—Issue 2. Consequently, turbulence becomes more ordered and more anisotropic; and flow becomes partially more laminarized.

The idea of using an asymmetric drop shaped form of pressure waves perturbation was proposed in U.S. Pat. No. 8,573,896. It will be understood, from that patent, that the front time is 2-3 times less than the time interval of restoring pressure in a wave; the back time of each period. This type of asymmetry of the pressure waves/perturbations provides, on average, a larger state of ordered turbulence and a partial laminarized state of the turbulent flow. These waves were intended to be used in the pipeline transportation of flowable media for decrease of hydrodynamic resistance. Testing use of these waves for decrease of hydrodynamic resistance of pipeline transportation of water flow, in industrial environments, has shown good results.

All these effects were obtained in the frequency range of a few hertz (Hz). Most of them were obtained as the confirmation of physical effects. There are no data, of optimal parameters of pressure perturbations or waves, providing maximum of various effects, and energy balance, etc.

Unusual results have been presented in a paper by Jakob Kühnen, et al. titled *Destabilizing Turbulence in Pipe Flow*, in Methods and Extended Data. There, the authors formulated the problem of the full laminarization of the turbulent water flow under the action of small perturbations. Stated in this way, the problem contradicts the fundamental conditions of absolute stability of the developed turbulent flow, which are generally accepted as a hypothesis in hydrodynamics.

For example, four small rotors in a plane perpendicular to the longitudinal axis of a pipe, with the angular azimuthal interval 90°, were installed inside of a pipe. The plane of rotation of rotors is perpendicular to the same axis. Rotors are located in the vicinity of the boundary layer and connected to a source of electricity. The developed turbulent flow, with Reynolds number of 50000, was weakly perturbed by rotors, whose angular velocity is 7 rotations per second. This was enough to create full laminarization the turbulent flow; additionally, hydrodynamic resistance was decreased to 90%. This effect was obtained by experimentation as well as by computer simulation.

The above presented results, of targeted studies of turbulent flows disturbances in order to reduce hydrodynamic drag and save energy during pipeline transporting of fluid flows, are very important for practical use. Wave energy is most suitable form of perturbations. Therefore, development of the pressure wave generators with controlled amplitude, frequencies and waveform, for the use in different technologies, is the very actual task.

Therefore, a task of the present invention is the development of a pressure wave generator with a dynamic reflector of pressure impulse for generating any kind of symmetrical and asymmetrical pressure waves and perturbations of any amplitudes, frequencies and waveforms, and providing minimal radial mechanical action on the shaft of the pressure wave generator. Other advantages of the present invention will become apparent as the description proceeds.

Definitions

To assist with the understanding of the discussion of the present invention, the following definitions are provided.

1. A "dynamic reflector of pressure impulse" according to the present invention, is a longitudinal three-dimensional surface, configured in the inner movable cylindrical solid wall, axially located between the third end cap and the cross-sectional opening, having a radially-azimuthal variable concave curvature, and reflecting an incident pressure impulse.

It operates only during rotation motion of the inner movable cylindrical element relatively to outer fixed cylindrical element. Therefore, it is defined as the "dynamic reflector of pressure impulse" and is used on the stage of decreasing of the common surface from a maximum value to zero, for a short duration time. A radial-azimuthal variable concave curvature of the surface of dynamic reflector of pressure impulse depends on the length and radiuses of the inner and of the outer surfaces of the inner movable cylindrical solid wall of inner movable cylindrical element, on the density of the incident pressure impulse, profiles of the surfaces of cross-sectional openings of the fixed and of the movable cylindrical solid walls of the inner movable and of the outer fixed cylindrical elements.

2. An "exchange of pressure impulse" is the quantity of impulse exchanged between two zones of fluids with different pressures through their common surface during short duration time.

The common surface of fluid zones is changed vs. time during a period from zero to maximum value, during a front time $t_F$ by a given law; from a maximum value to zero, during a back time, $t_B = T - t_F$, by the other or the same law.

3. A "pressure impulse" is a quantity of pressure impulse incident to a three-dimensional longitudinal curvilinear cylindrical or concave solid surface, rotating around a cylinder axis.

The process of the incident pressure impulse on the mentioned surfaces, takes place only during its intersection with the surface of the cross-sectional opening in the outer fixed cylindrical solid wall.

A dynamic projecting of a part (or of all) of a rotating surface of the cross-sectional opening in the inner movable cylindrical solid wall to a surface of the cross-sectional opening in the outer fixed cylindrical solid wall, is identically with the definition of the intersection of sets. For example: the intersection of sets of two surfaces. This slightly modified definition of intersection of sets is available when the coaxial cylindrical surfaces are located very closely to each other. Such slightly modified definition is detailed described, schematically presented, and accepted by U.S. Pat. No. 10,233,952 at FIGS. 5 and 6. This modified definition, in the present invention, allows estimation of the averaged values of the incident pressure impulse, and a response of a reflected pressure impulse by a radial and an azimuthal mechanical action on the surface of dynamic reflector of pressure impulse.

4. A "dynamic common surface", $S_d(t)$ is a radial-azimuthal longitudinal projection of a part or of a whole rotating surface of a dynamic reflector of pressure impulse to a surface of the cross-sectional opening in the wall of an outer fixed cylindrical element.

5. "Efficiency of the dynamic reflector of pressure impulse" is a ratio between radial components of the mechanical reaction of the shaft of pressure wave generator, on the reflected pressure impulse from the longitudinal concave surface of the dynamic reflector of pressure impulse and from this projection onto the cylindrical surface itself.

This value is less than unity. The lower the dynamic reflector of pressure impulse efficiency, the lower the radial component of the mechanical action of the pressure impulse on the shaft of the pressure wave generator.

SUMMARY OF THE INVENTION

In accordance with the present invention, a pressure wave generator with dynamic reflector of pressure impulses, is provided and includes a controlled drive and a housing. The housing is in the form of an outer fixed cylindrical element comprising an outer fixed cylindrical solid wall having a length, an inner cylindrical surface with an inner radius and an outer cylindrical surface with an outer radius, an inner cavity having a volume and a longitudinal axis of symmetry. The outer fixed cylindrical solid wall is rigidly connected, longitudinally at both ends to end caps. The end caps are in the form of round solid discs and placed perpendicularly to the longitudinal axis of symmetry. A cross-sectional opening of the given profiled shape, size and single-position location, enclosed by the azimuthal angle α, is configured in the outer fixed cylindrical solid wall.

A collector, having a first end and a first cross-sectional area and a second end and a second cross-sectional area, an inner cavity having a volume. The first end is installed on an outer cylindrical surface of the outer fixed cylindrical solid wall, whose cross-section encloses the surface of the cross-sectional opening. The second end is connected to a first pipe having an inner cavity and a volume. A volume, of an inner cavity, of the outer cylindrical element, of the collector, and of the first pipe, form a first housing filled with a fluid and exposed to over pressure. An inner surface of the collector can be carried out in the form of helix. Such internal shape of the surface of collector imparts rotational motion to reflected pressure impulse.

An inner movable cylindrical element consists of an inner movable cylindrical solid wall, having a cavity and a volume, a length and concentrically located in a cavity of the outer fixed cylindrical element; it is rigidly connected, longitudinally at the both ends, to the end caps in the form of round solid discs perpendicular to the longitudinal axis of symmetry. The inner movable cylindrical solid wall is limited by the inner cylindrical surface and outer cylindrical surface, with an inner radius and an outer radius, correspondingly. A cross-sectional opening of a given profiled shape, size and a single-position location enclosed by the azimuthal angle γ, is configured in the wall. There is a cross-sectional opening through the third end cap which connects to a second pipe having an inner cavity and a volume. A volume of an inner cavity of the inner movable cylindrical element through the cross-sectional opening in the third end cap and of the inner cavity of the second pipe form a second housing filled with a fluid and exposed to under pressure.

A shaft of the pressure wave generator, whose axis of rotation coincides with the longitudinal axis of symmetry of the outer fixed cylindrical solid wall. The shaft is rigidly connected to the end caps of the inner movable cylindrical element and further is axially connected to a shaft of a controlled drive, whose longitudinal axis of symmetry coincides with the longitudinal axis of symmetry of the outer fixed cylindrical solid wall.

A single-position location of the surfaces of cross-sectional openings in the solid walls of the fixed and of the movable cylindrical solid walls are configured such, that during the rotating in the unambiguous direction of the inner movable cylindrical element relatively to outer fixed cylindrical element, by the shaft of the drive of the pressure wave generator, there is provided a periodic intersection of the surfaces of cross-sectional openings which forms a common surface between the first housing and the second housing. The invention includes volumes of liquids filled in the 1st and the 2nd housings and being exposed to under pressure and overpressure which are communicating through the common surface changing versus time. This communicating is accompanied by changing of pressure impulse through the common surface, connecting the volumes of liquids with different pressures.

A dynamic reflector of pressure impulse is configured in the inner movable cylindrical solid wall whose longitudinal three-dimensional surface has a radially-azimuthal variable concave curvature. This concave curvature is obtained as a result of a subtracting from a volume of the inner movable cylindrical solid wall a volume of a longitudinal truncated cylindrical segment, limited by the outer radius of the outer cylindrical surface, a face of the longitudinal radial-azimuthal convex surface, a face of the longitudinal radial-azimuthal surface, and a surface of the curvilinear circular segment limited by the angle β. A surface of dynamic reflector of pressure impulse longitudinally is located between the third end cap and the surface of cross-sectional opening. A radial-azimuthal variable curvature of the surface of the dynamic reflector of pressure impulse depends on the length and the radiuses of the inner and of the outer cylindrical surfaces of the inner movable cylindrical solid wall and of the length and the radiuses of the inner and of the outer cylindrical surfaces of the outer movable cylinder solid wall and of the profiles of the surfaces of cross-sectional openings in the solid walls of the inner movable cylindrical element and of the outer fixed cylindrical element. The concave surface of the dynamic reflector of pressure impulse provides a reflection of the incident pressure impulse during the intersecting with the surface of cross-sectional opening in the outer fixed cylindrical solid wall, while the inner movable cylindrical element is rotating relatively to outer fixed cylindrical element in the unambiguous direction.

A mechanical reaction of the concave surface on the reflected pressure impulse is decomposed in such a way inside the whole angle β, that provides a minimal value of a radial component of the mechanical reaction on the shaft of the pressure wave generator and a maximum value of the azimuthal component of the mechanical reaction on the shaft of the pressure wave generator. A radial-azimuthal variable concave curvature depends on the amplitude, frequency and waveform of the generating pressure waves, on the radiuses of the inner and of the outer cylindrical surfaces and of the size of profiles of the surfaces of cross-sectional openings in the inner movable cylindrical solid wall and outer fixed cylindrical solid wall.

A stiffener rib, axially-azimuthally divide the surface of the cross-sectional opening in the inner movable cylindrical solid wall of the inner movable cylindrical element from the surface of the dynamic reflector of pressure impulse. It will be understood that a radial height of the stiffener rib will not exceed an outer radius of the solid wall of the inner cylindrical element. An axially-azimuthal shape of the stiffener rib coincides with an axially-azimuthal shape of the surface of said opening.

The present invention relates to a generator of pressure waves with a dynamic reflector of pressure impulse. The process of generating waves by the use of a pressure wave generator is based on the exchange of pressure impulse between fluid volumes with different pressures through the time-dependent common surface.

The pressure wave generator comprises an outer fixed cylindrical element rigidly closed at both ends by end caps perpendicular to the longitudinal axis of symmetry of the outer fixed cylindrical solid wall and having a cross-sectional opening of a given shape, size and a single-position location, is configured in the outer fixed cylindrical solid wall. The pressure wave generator connected to a collector whose inlet surface encloses the surface of cross-sectional opening. A volume of a cavities of the outer fixed cylindrical solid wall, of the collector, and of the first pipe, form a first volume filled with a fluid exposed to overpressure. The inner movable cylindrical element concentrically located in a cavity of the outer fixed cylindrical element, rigidly closed at both ends by end caps perpendicular to the same longitudinal axis of symmetry and having in a movable cylindrical solid wall a cross-sectional opening of a given shape, size and a single-position location is configured. The cavity of the inner movable cylindrical element connected to a connecting pipe through cross-sectional opening in the solid wall of the end cap. A volume of a cavity of an inner cylindrical element and of the connecting pipe form a second volume filled with a fluid exposed to under pressure. The first volume and the second volume communicate between themselves through a common surface. Communication is carried out only during a rotating motion of the inner movable cylindrical element relatively to outer fixed cylindrical element, by a shaft of the pressure wave generator connected to a shaft of the controlled drive. Such rotating motion provides periodic intersection of surfaces of profiled cross-sectional openings in the solid walls of the outer fixed and of the inner movable cylindrical elements.

Parameters of the generated pressure waves, amplitude, frequency, and waveforms are univocally determined by radiuses of the inner movable and outer fixed cylindrical solid-walls, shapes, sizes and single-position location of the surfaces of profiled cross-sectional openings, values of overpressure of the first volume and under-pressure of the second volume and of the direction of rotation of the inner movable cylindrical element relatively to the outer fixed cylindrical element.

Known reflectors of the standard forms (see, U.S. Pat. Nos. 5,058,569, 517,428, and 8,535,249), for example, parabolic, are used in the medical devises, for focusing shock waves. However, these examples do not change the incident wave parameters and do not take part in the process of forming the waves.

Results of experimental research of pressure and pressure impulse reflection, and their ratio, versus angle of incidence of shock waves striking on the flat surface, are presented in (N. Kingery, et al. Technical Report Arbrl-Tr-02537, *Reflected overpressure impulse on a finite structure* (Ballistic Research Laboratory. December 1983)). In these applications wave sources and reflectors are fixed.

Analysis of the process of forming and generating pressure waves by the use of pressure wave generator is inalienably linked with the operation of a dynamic reflector of pressure impulse. For a better understanding of the importance of the dynamic reflector of pressure impulse, compare the process of forming and generating pressure waves using a generator comprising coaxial cylindrical elements without a dynamic reflector of pressure impulse and with the dynamic reflector of pressure impulse. Proving the necessity of the presence of dynamic reflector of pressure impulse, as a component of the pressure wave generator, is based on a qualitative estimation and a graphical interpretation of the incident and reflected pressure impulse from its surface.

BRIEF DESCRIPTION OF THE DRAWINGS

FIG. 4A—corresponds to moment of time $t_1$, $t_1 > t_F$;

FIG. 4B—corresponds to moment of time $t_2$, $t_F \leq t_2 \leq T$.

DESCRIPTION OF THE PREFERRED EMBODIMENT

Figure 1:
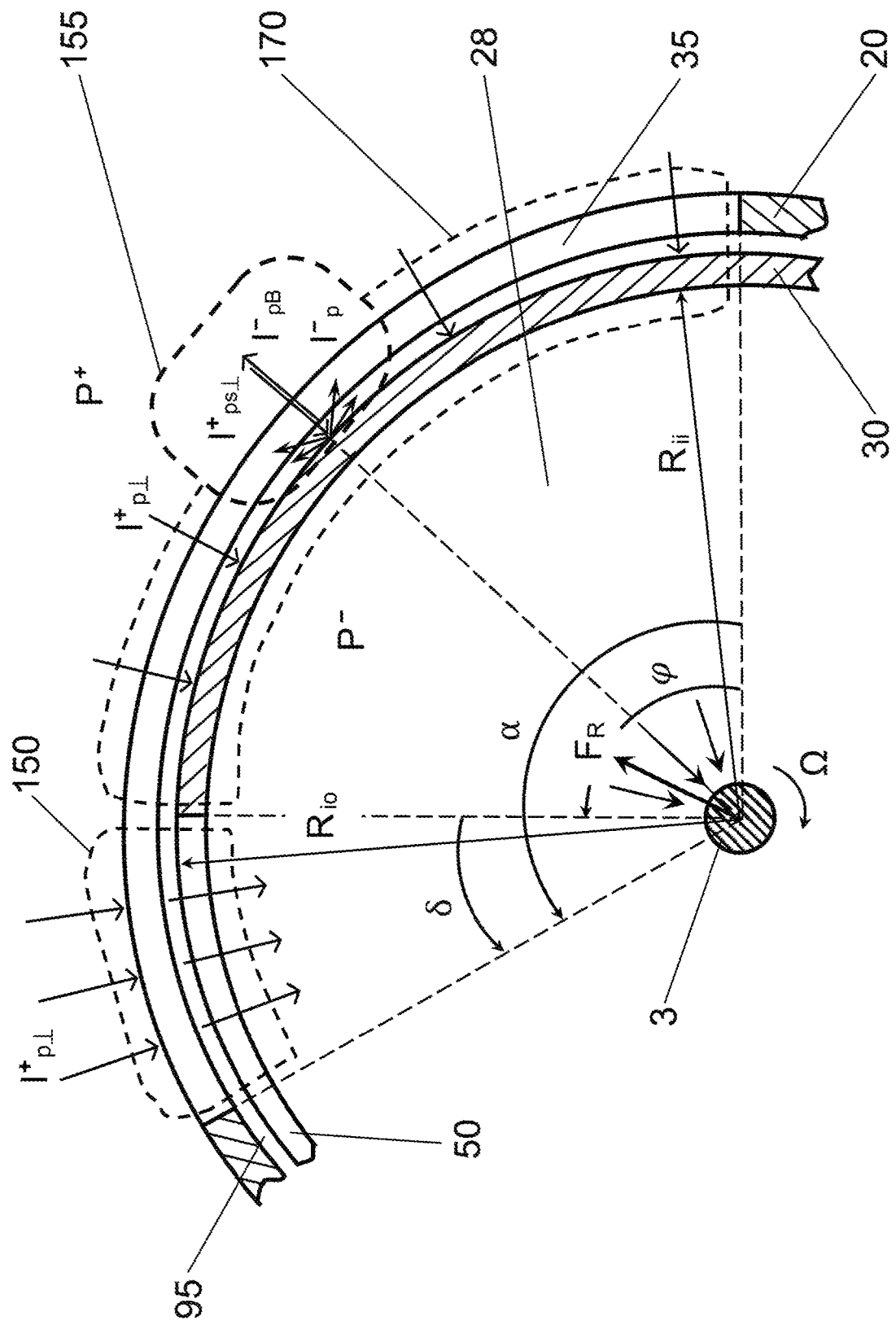
FIG. 1 is a partial cross-sectional view of a pressure wave generator without a dynamic reflector of pressure impulse. A cross-section plane also passes through a collector, but it is not shown.
Figure 2:
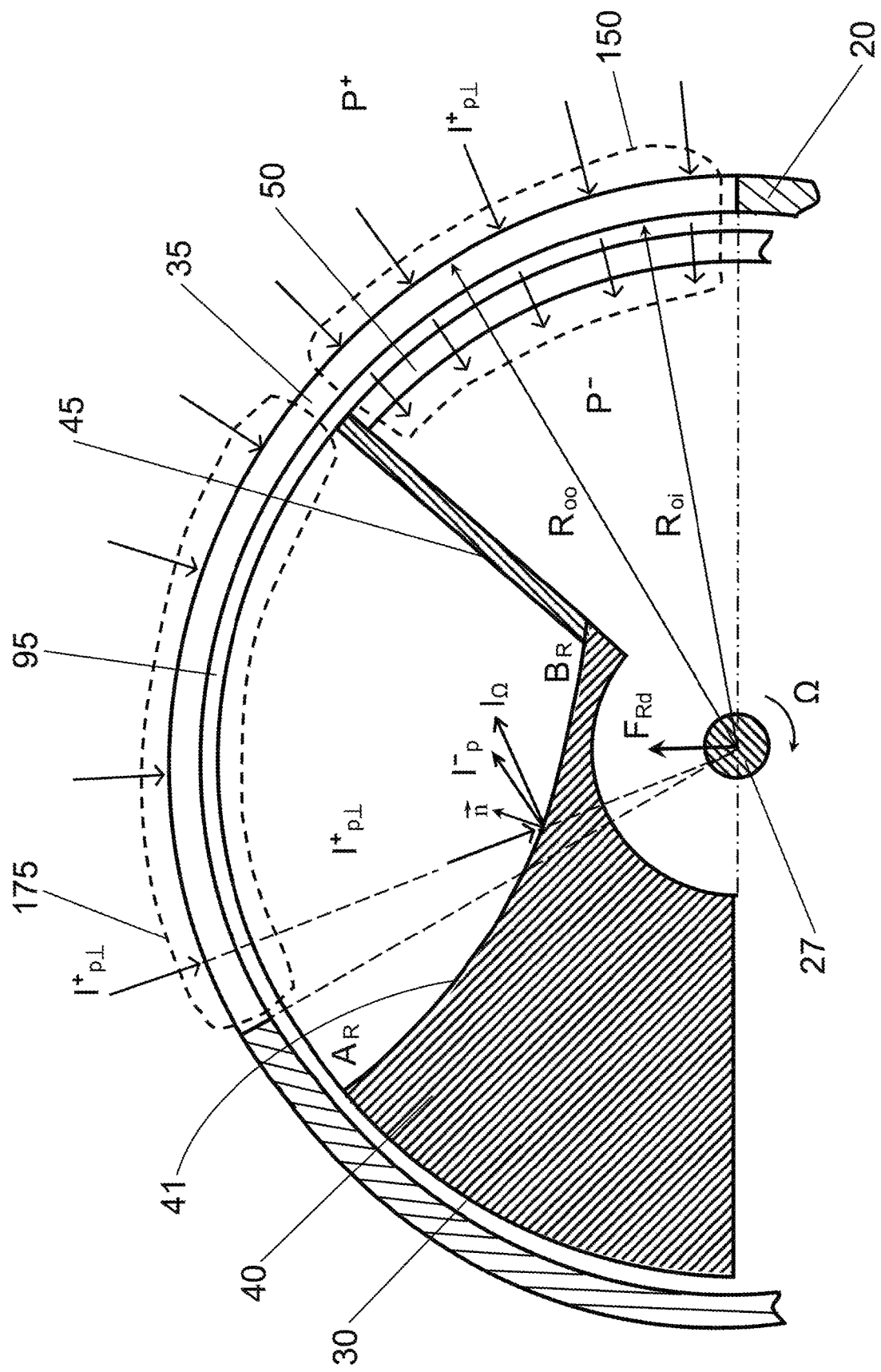
FIG. 2 is a partial cross-sectional view of a pressure wave generator with a dynamic reflector of pressure impulse. A collector cross-section is not shown.

FIGS. 1 and 2 show the advantages of the using a dynamic reflector of pressure impulse with a longitudinal radial-azimuthal concave surface. In this case, the radial component of the mechanical reaction on the shaft of the pressure wave generator is considerably decreased.

The present invention corrects the problem with a surface of the incident and reflected pressure impulse, discussed above in the background and summary of the invention.

It will be seen that FIG. 1 shows a part of radial-azimuthal cross-section of the instant position of the cross-sectional openings 35 and 50 in the outer fixed solid wall 20 and inner movable solid wall 30 of the pressure wave generator, not comprising a dynamic reflector of pressure impulse, during rotation of the inner movable cylindrical element 30 by a shaft of the pressure wave generator 27. Parts of the surfaces of cross-sectional opening 35 and 50, enclosed by the dashed contour 150, form a common surface, enclosed by the azimuthal angle δ.

Forming of the pressure waves follows after changing the common surface. Increasing of the common surface 150 from zero to a maximum, by the given law, over the front time $t_F$, is accompanied by increasing the exchange pressure impulse between fluid volumes with pressures $P^+$ and $P^-$ (FIG. 1). And as a consequence, amplitude of pressure in the forming wave is increasing by the given law and reaches maximum. Estimated value of the exchange pressure impulse between the first volume and the second volume, $I^+_{P \square F}$ during the frontal time, $t_F$ through the common surface, $S_i$ is estimated by the integral $$I^+_{P \square F} \sim \int_0^{t_F} [P^+ - P^-] * \frac{S_i(t)}{S_m} dt, \tag{1}$$

$P^+$, $P^-$ are initial values of overpressure and under-pressure in the first and in the second volumes, communicating through the common surface $S_i(t)$; $S_i(t)$ changing versus time by the given law, t is the current time; t=0 ... $t_F$. $S_{im}$ is the maximum value of the common surfaces in the moment $t_F$, during the rotating of the inner movable cylindrical wall.

Decreasing the wave amplitude over the back time, $t_B$, $t_B=T-t_F$ is accompanied by the mutual exchange of pressure impulse between the first volume and the second volume through the common surface and by the reflected pressure impulse, $I^-_P$ from the outer surface of the inner movable cylindrical surface 30 (FIG. 1). The dashed contour 155 is a cross section of a spatial surface zone adjacent to the outer surface of the inner movable cylindrical solid wall containing point of the incident $I^-_{P \square}$ and of the reflected $I^-_{PB}$ pressure impulse. Reflected pressure impulse $I^-_{PB}$ is parallel to the incident pressure impulse $I^+_{P \square}$, 155 (FIG. 1). Due to the curvature of the outer cylindrical surface the reflected pressure impulse $I^-_{PB}$ is partially dispersed; short arrows around the incident point. For the further estimations we suppose, that the angle of the incident pressure impulse to the inner movable solid surface is equal to the angle of the reflected pressure impulse. Moreover, a part of the incident pressure impulse is dispersed.

Estimated value of the mutual exchange of the pressure impulse forming the wave, during the time interval $t_B$ $$I^+_{P \square B} \sim \int_{t_F}^{T} [P^+ - P^-] * \frac{S_{iB}(t)}{S_{im}} dt \tag{2}$$

$S_{iB}(t)$ is the common surface decreasing versus time, during the time interval $t_B$ from a maximum value to zero, by the given law.

An additional contribution to the pressure impulse, amplitude and waveform, over a back time, $t_B$ is determined by the perpendicular incident pressure impulse $I^+_{PS \square}$ to the solid surface of the inner movable cylindrical wall 30. The corresponding reflected pressure impulse is perpendicular to the same solid surface and partially is dispersed into fluid zone with an overpressure.

Quantity of the incident pressure impulse is estimated by the integral:

$$I_{PS \square} \sim \int_{t_B}^{T} [P^+(t, S_3(t))] * dt \tag{3}$$

$S_3(t)$ is the solid surface of the inner movable cylindrical solid wall, on which the incident pressure impulse is perpendicularly. Dashed contour 155 represents qualitatively the sketch of pressure impulse vectors acting on the elementary surface of the rotating inner cylindrical solid wall.

Value of the estimated pressure impulse (3) plays an important role in the operating and stability of the pressure wave generator, especially during generating pressure waves with relatively high amplitudes. The response of the reflected pressure impulse is manifested in the form of a radial mechanical reaction on the cylinder surface and on the shaft of pressure wave generator and is presented in FIG. 1. $F_R$ is the average value of the radial mechanical action of the reflected pressure impulse on the shaft of the pressure wave generator, over a time $t_B$, varying in the magnitude and direction.

Decreasing of this component of radial mechanical reaction is one of the goals of the present invention.

It is should be clear, that this part of longitudinal cylindrical surface, FIG. 1, 170 has to be changed to the longitudinal radial-azimuthal concave surface with variable curvature. Exactly this surface, is a surface of a dynamic reflector of pressure impulse rotating synchronically with the inner cylinder.

The dynamic reflector of pressure impulse intended to be used for the decomposition of reflected pressure impulse to the azimuthal and the radial components. Besides, the radial-azimuthal curvature of the surface of dynamic reflector of pressure impulse is such that provides a maximum value of the azimuthal component and minimal value of radial component of mechanical actions on the shaft of pressure wave generator.

It is clear, that the directions of reflected pressure impulse from a longitudinal concave surface, FIG. 2 of dynamic reflector of pressure impulse and from a longitudinal cylindrical surface, FIG. 1 are different. Therefore, the waveforms on the time interval $t_B$ also are different. Thus, the rotating concave surface of dynamic reflector of pressure impulse, participates not only in the decomposition of the incident pressure impulse, but also in the process of the forming pressure waves itself.

The basic purpose of the proposed dynamic reflector of pressure impulse is aimed to decompose the reflected pressure impulse to azimuthal and radial components. It has to satisfy the following requirements: provide such a change of the radial-azimuthal concave curvature of a longitudinal surface of the dynamic reflector of pressure impulse that corresponds to maximum reflection of the incident pressure impulse on the last stage of the full closure of the common surface.

A partial cross-sectional area view of the outer fixed and inner movable cylindrical elements of the pressure wave generator, with the rotating dynamic reflector of pressure impulse, is presented in FIG. 2. The secant plane intersects a part of the surface of dynamic reflector of pressure impulse 41, a stiffener rib 45 and a part of the common surface 175, formed by surfaces of profiles of the cross-sectional openings 35 and 50 in the outer fixed and inner movable cylindrical solid walls of the outer fixed 20 and inner movable 30 cylindrical elements. Mechanical reaction of the dynamic reflector of pressure impulse on the incident pressure impulse, $I^+_{p\perp}$ on the current point with the normal unit vector n, $I_\Omega$ is the impulse transmitted by rotating dynamic reflector of pressure impulse:

$$I_\Omega \sim (r^*\Omega)^2$$

r is the current radius of the point on the surface of dynamic reflector of pressure impulse to rotating axis.

Radial component of the mechanical reaction, $F_{Rd}$ (FIG. 2) of the shaft of the pressure wave generator 27 is much less than $F_R$ (FIG. 1). In reality, $F_{Rd}$ is formed by the incident pressure impulse on the concave surface 41 of the dynamic reflector of pressure impulse 40, while $F_R$ is formed by the same incident pressure impulse, $I^+_{p\perp}$ to the outer cylindrical surface. Impulse $I_\Omega$, basically gives a contribution to the azimuthal component.

The condition, $F_{Rd} \ll F_R$ satisfies the basic requirement to the use of dynamic reflector of pressure impulse with a concave surface as a new constructive element in the pressure wave generator.

Figure 3:
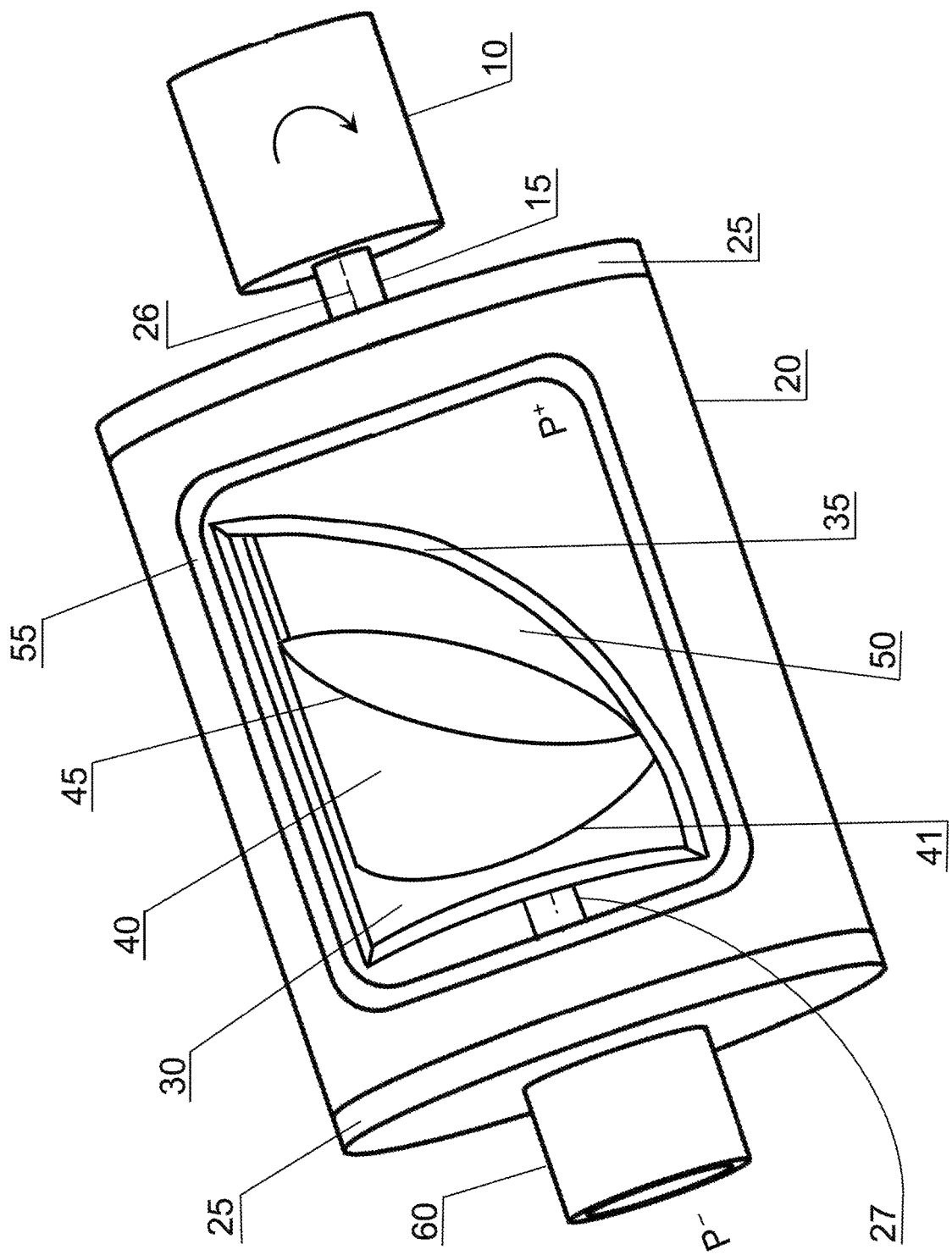
FIG. 3 is a perspective view of a pressure wave generator with a dynamic reflector of pressure impulse.

A perspective view of a pressure wave generator with a dynamic reflector of pressure impulse, proposed in the invention is presented in FIG. 3. The main elements of pressure wave generator that take part in the process of the forming pressure waves have a cylindrical shape. Although they may also have a different shape, for example, a truncated cone, hemispheric, disk, etc.

A first housing of generator is an outer fixed cylindrical element consists of an outer fixed cylindrical solid wall 20 having an inner cavity and a volume, an inner $R_{oi}$ and outer $R_{oo}$ radiuses, and rigidly connected longitudinally at both ends to the end caps 25 in the form of round discs perpendicular to a longitudinal axis of symmetry 26. A cross-sectional opening 35 of the given shape, sizes, and single-position location, enclosed by the azimuthal angle α is configured in the cylindrical solid wall 20 (FIG. 1).

A collector 55 (whole collector not shown), has a first end and a first cross-sectional area and a second end and a second cross-sectional area and an inner cavity having a volume. The first end of collector is installed on the outer cylindrical surface of the outer fixed cylindrical solid wall 20 and encloses the surface of a cross-sectional opening 35. Another end of the collector is connected to a first pipe (not shown) having an inner cavity and a volume. A volume of an inner cavity of the outer cylindrical element 20, of the collector 55 and of the first pipe form a first volume filled with a fluid exposed to over pressure, $P^+$. An inner surface of the collector can be helicoidally-shaped. Such internal form of the inner surface of collector imparts the rotational motion to the reflected pressure impulse.

An inner movable cylindrical element consists of an inner movable cylindrical solid wall 30 having an inner cavity and a volume, a length, an inner $R_{ii}$ and outer $R_{io}$ radiuses concentrically located in a cavity of the outer fixed cylindrical solid wall rigidly connected longitudinally at the both ends to the end caps 28 (FIG. 1) in the form of round discs perpendicular to the longitudinal axis of symmetry 26. A cross-sectional opening 50 of a given shape, size, and a single-position location, enclosed by the azimuthal angle γ (not shown) is configures in the cylindrical solid wall 30; wherein the azimuthal angle γ is more than the azimuthal angle α. There is cross-sectional opening through the end cap connected to a second pipe 60 having an inner cavity and a volume. A volume of an inner cavity of the inner movable cylindrical wall and of the second pipe 60 form a second housing filled with a fluid exposed to under pressure, $P^-$. Pressures $P^+$ and $P^-$ can be, for example, over pressure and under pressure on the operating pump. In this case the pressure wave generator is connected parallel to a pump. The inner surface of the outer fixed cylindrical solid wall 20 with the radius $R_{oi}$ and an outer surface of the inner movable cylindrical solid wall 30 with the radius a $R_{io}$ are separated by a thin gap 95, in FIGS. 1 and 2. A shaft of the pressure wave generator 27, whose axis of rotation 26 coincides with the longitudinal axis of symmetry of the inner movable 30 and of the outer fixed cylinder 20 solid walls. The shaft of the pressure wave generator 27 is rigidly connected to the end caps 28 of the inner movable cylindrical element and axially is connected to a shaft 15 of a controlled drive 10 whose longitudinal axis coinciding with the longitudinal axis of symmetry of the outer fixed cylindrical solid wall. The shaft of the pressure wave generator 27, whose axis of rotation 26 coincides with the longitudinal axis of symmetry of the inner 30 and of the outer 20 cylindrical solid walls is rigidly connected to the end caps 28 of the inner movable cylindrical element and axially is connected to a shaft 15 of a controlled drive 10, whose longitudinal axis of rotation coinciding with the longitudinal axis of symmetry of the outer fixed cylindrical solid wall. Profiles of the surface of cross-sectional openings in the solid walls of the outer fixed and inner movable cylindrical elements 35 and 50 are determined by the method disclosed in the U.S. Pat. No. 10,233,952.

Generating pressure waves by the use of pressure wave generator with dynamic reflector of pressure impulse, according to the present invention, is carrying out in the following manner. Consider the example, α=β. Suppose, that the pressure wave generator is connected parallel to an operating pump creating overpressure in the first volume and under_pressure in the second volume; at the initial moment of time t=0 the common surface is zero and amplitude of pressure in generated wave is zero.

After turning on the controlled drive 10 the inner movable cylindrical solid wall 30 is set in the rotation motion relatively to outer fixed cylindrical solid wall 20, in an unambiguous direction. With this direction of rotation, during the time interval, t=0 . . . $t_F$, the common surface 150 (FIG. 1) is increasing from zero to a maximum. The volumes of the first and the second volume are communicating between the them through the common surface 150. The exchange of pressure impulse between fluid volumes from the first volume exposed to over pressure, $P^+$ and from the second volume exposed to under pressure, $P^-$ through the common surface is taking place. This process of the exchange of pressure impulse is accompanied by forming simultaneously, on the common surface, of rarefaction pressure wave, $p^-$ propagating in the fluid volume with overpressure and compression wave $p^+$ propagating in the fluid volume with under pressure. Parameters of the generated pressure waves $p^+$ and $p^-$ amplitude, frequency and waveforms are univocally determined by radiuses of the inner movable 30 and of the outer fixed 20 cylindrical solid walls, shapes, sizes and single-position location of the surfaces of profiled cross-sectional openings 30 and 50, values of pressures p⁺ and p⁻ in the fluid volumes, and of the unambiguous direction of rotation of the inner movable cylindrical solid wall 30 relatively to outer fixed cylindrical solid wall 20. On the stage of the increasing common surface, during the frontal time, $t_F$, forming the pressure wave follows after the changing the common surface 150. During the time interval $t_F$ value of the common surface 150 increases from zero to a maximum by the given law. This is accompanied by increasing the exchange of pressure impulse between fluid volumes with pressures P⁺ and P⁻. As a consequence, amplitude of pressure in the forming wave is increasing by the law, related to the law of change of the common surface versus time and reaches a maximum. Pressure waves p⁺ and p⁻ during the front time $t_F$ are forming and generating only due to the exchange of pressure impulse, $I^+_{p\square}$ between fluid volumes through the common surface. Estimated value of the pressure impulse on the frontal time is determined by (1). It is obviously, that $I^+_{p\square F}$, an amplitude of generated wave depends on the frontal time, $t_F$, pressures P⁺ and P⁻, and maximal value of the common surface, $S_{im}$.

At time $t=t_F$ the common surface and, consequently, the amplitudes of generated waves reach maximum. At t, $t_F \leq t \leq T$, the common surface, and therefore the amplitude of pressure decreases from a maximum to zero.

Decreasing the common surface 150 (FIG. 1) is carried out by rotation of inner movable cylindrical solid wall and changing the relative position of the cross-sectional openings 50 and 35. FIG. 1 shows, for all t, $t_F \leq t \leq T$, the surface $S_o$ of the fixed cross-sectional opening 35 is equal to a sum of two common surfaces: the intersecting surfaces $S_i(t)$, 150 of the cross-sectional openings 35 and 50, enclosed by the angle δ; the intersecting surfaces $S_s(t)$, 170 of the cross-sectional opening 35 and of the cylindrical surface of the solid wall 30, enclosed by the angle φ:

$$S_0 = S_i(t) + S_s(t) \tag{4}$$

The schematic presentation on a flat part of the cylindrical common surface of FIG. 1, described by equation (4) is mapped in FIG. 4A.

Decreasing of the pressure wave amplitude over the back time, $t_B$, $t_B = T - t_F$ is accompanied not only by the mutual exchange of pressure impulse between fluid volumes through the common surface, but also by the reflected pressure impulse, $I^-_p$ from the outer cylindrical surface of the inner movable cylindrical solid wall 30 (FIG. 1). The dashed contour 155 is a cross-section of a special zone adjacent to the surface of the inner movable cylindrical solid wall, containing points of the incident $I^+_{p\square}$ and of the reflected $I^-_{PB}$ pressure impulse. Reflected and incident pressure impulse, $I^-_{PB}$ and $I^+_{PS\square}$ are parallel, 155 (FIG. 1). Due to the curvature of cylindrical surface the reflected pressure impulse $I^-_{PB}$ is partially dispersed; short arrows around the incident point. For the further estimation we suppose, that the angle of the incident pressure impulse to a solid surface is equal to the angle of the reflected pressure impulse. Moreover, a part of the incident pressure impulse is dispersed.

Restoring the common surface to its previous value, to zero, usually is carried out by other law than its increasing to a maximum, i.e. usually $t_F \neq t_B$. But if $t_F = t_B$ and the waveform is the same, generating waves are of the symmetrical form, for example, semi sine waves. If $t_F \neq t_B$ a generated wave is asymmetrical, i.e. the law of change of pressure in the wave is of asymmetrical form; for example:

the drop-shaped form. The estimated value of the mutual exchange of pressure impulse forming the wave during the time interval $t_B$ is defined by (2). $S_{iB}(t)$ is the variation of the common surface versus time, during the time interval $t_B$, from a maximum value to zero, by the given law. For the small value of the solid cylindrical surfaces 30, or of angle φ, the radial mechanical reaction $F_R$ of the shaft of the pressure wave generator to the perpendicular pressure impulse is small (FIG. 1).

Figure 4:
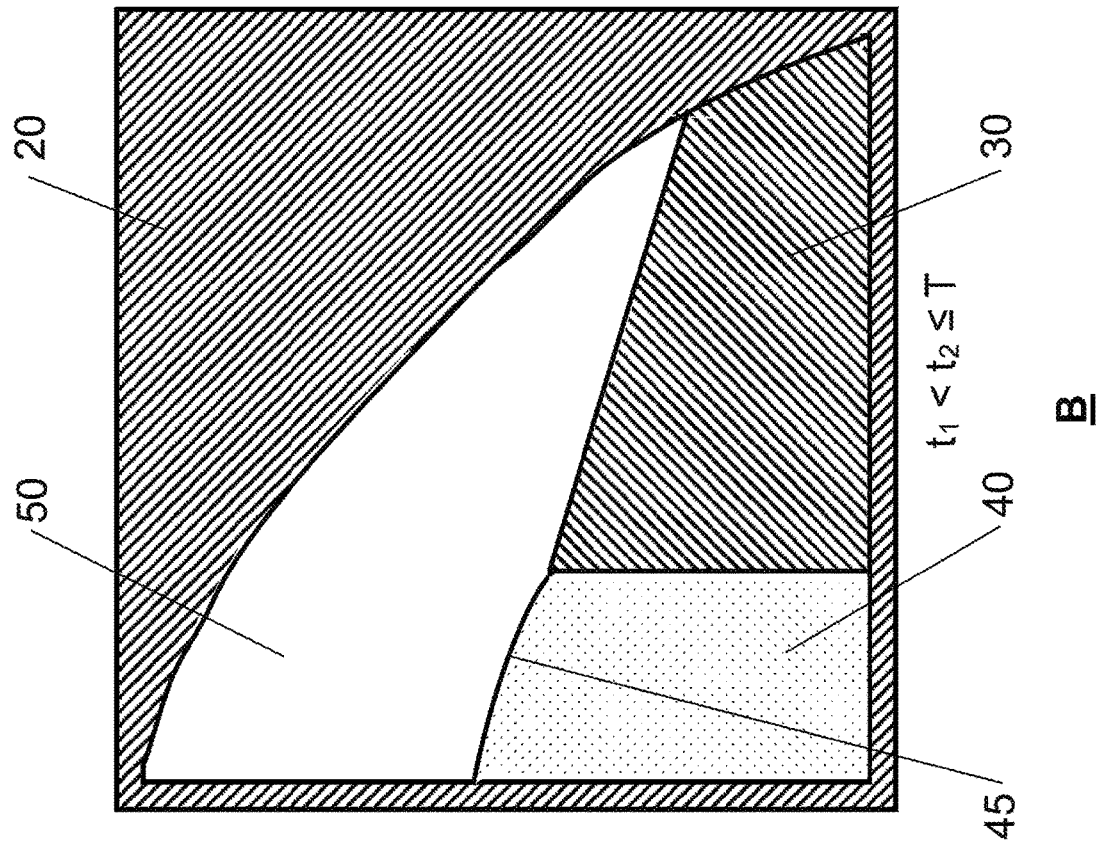
FIGS. 4A and 4B are examples of schematic mapping on a flat surface of the intersection of cylindrical surfaces of cross-sectional openings in the solid walls of the outer fixed and of the inner movable cylindrical elements, where.
Figure 4:
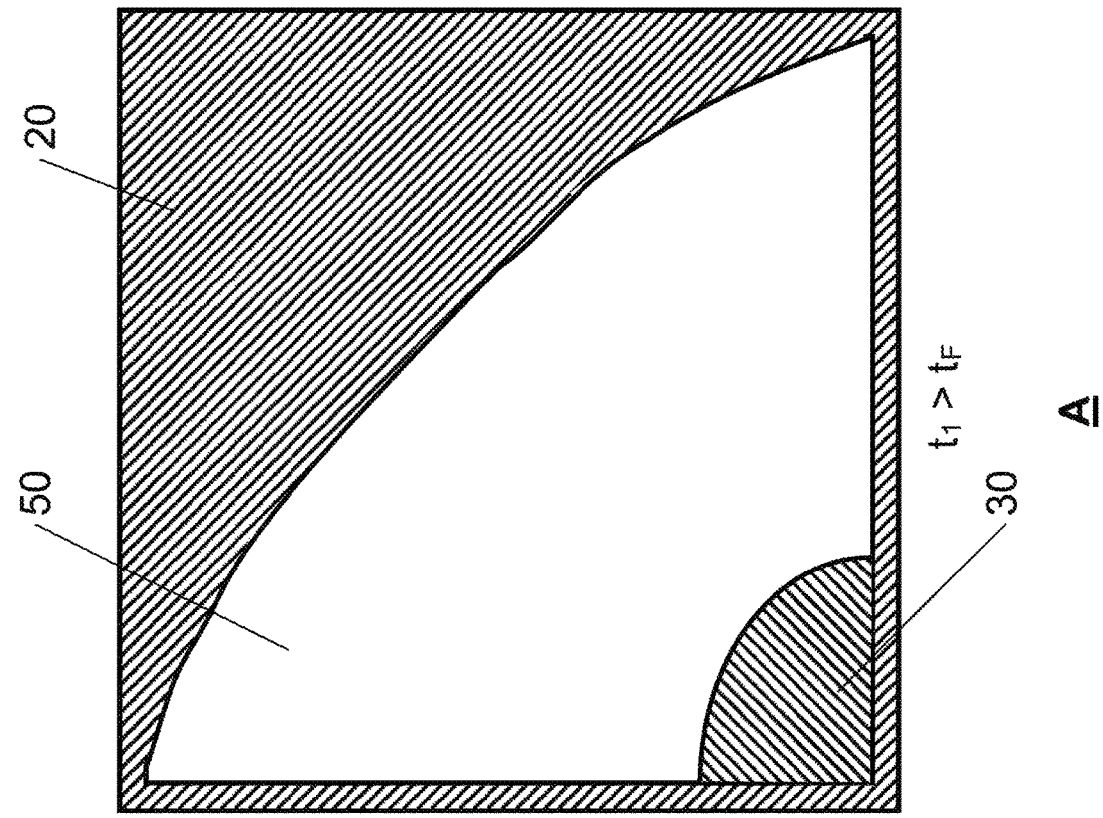

Estimated value of mechanical reaction is carrying out by the use (3), for any time interval $t_F < t < T$, $S_s(t)$ is an intersecting surface of the inner cylindrical solid wall 30, FIG. 4, A with the surface $S_o$, of the fixed surface of cross-sectional opening 35 (FIG. 1). Dashed contour 155 (FIG. 1) represents qualitatively the sketch of pressure impulse vectors acting on the elementary surface of the rotating inner movable cylindrical solid wall.

Pressure impulse (3) can play an important role in the operating pressure wave generators, when generating pressure waves of relatively high amplitudes. The average radial mechanical reaction of the reflected pressure impulse of the shaft, $F_R$ over a time $t_B$, is presented in FIG. 1.

Decreasing the component of radial mechanical reaction of the shaft of the pressure wave generator is the basic goal of the present invention.

Statement of the problem. Decrease the radial mechanical reaction of the shaft of pressure wave generator to the reflected pressure impulse, on the stage of decreasing common surface from a maximum value to zero, by changing the radial-azimuthal curvature of the part of the longitudinal surface of the inner cylinder, where pressure impulse is incident.

This part of longitudinal cylindrical surface has to be changed to the longitudinal radial-azimuthal concave surface with variable curvature. Exactly this surface is a surface of a dynamic reflector of pressure impulse rotating synchronically with the inner movable cylindrical solid wall, shown in FIG. 3.

The dynamic reflector of pressure impulse 40 intended to be used for the decomposition of reflected pressure impulse to the azimuthal and the radial components. Besides, the radial-azimuthal curvature 41 of the longitudinal surface of dynamic reflector of pressure impulse is such that provides a maximum value of the azimuthal component and minimal value of radial component of mechanical reactions of the shaft of pressure wave generator.

It should be clear, that the direction of reflected pressure impulse from the longitudinal concave surface of dynamic reflector of pressure impulse and from the longitudinal cylindrical surface, of the same axial cylinder length, enclosed by the equal azimuthal angles, is different. Therefore, waveforms on the time interval $t_B$ also are different. Thus, the rotating in the unambiguous direction of the concave surface of dynamic reflector of pressure impulse, participates not only in the decomposition of the reflected pressure impulse, but also in the process of the forming pressure waves itself.

Being aimed to decomposition of the reflected pressure impulse, a dynamic reflector of pressure impulse has to satisfy the following requirements:

1. provide the decomposition of the reflected pressure impulse to maximum azimuthal and minimum radial components by the use of variable radial-azimuthal curvature of the concave surface;
2. doesn't introduce additional mechanical elements inside of the pressure wave generator;

3. doesn't change the pressure difference (P⁺−P⁻) on the common surface, in order to maintain the given law of change of pressure in the generated wave.

For the small values of the common surface $S_s(t)$, the radial component of the mechanical reaction of the shaft 27 on the reflected pressure impulse is small (FIG. 4A). With increasing the common surface $S_s(t)$, the incident pressure impulse on the cylindrical surface increases. Consequently, the radial mechanical reaction of the shaft is increased.

With a further increase in the common surface $S_s(t)$, the value of radial-mechanical reaction of the shaft of the pressure wave generator 27 reaches some permissible value. For decreasing this reaction, the part of longitudinal cylindrical surface, comprised in the $S_s(t)$, for which the radial component exceeds the permissible value, configures in the form of the longitudinal radial-azimuthal concave surface. That is exactly the three-dimensional surface of a dynamic reflector of pressure impulse. It is enclosed by the azimuthal angle β. From the above follow the next inequality, β/γ<1. FIG. 4B shows the mapping of cylindrical surfaces presented in the cross-section in FIG. 2, on the flat surface. Dynamic intersecting surface 40 is more than zero, $S_d(t)>0$.

Figure 5:
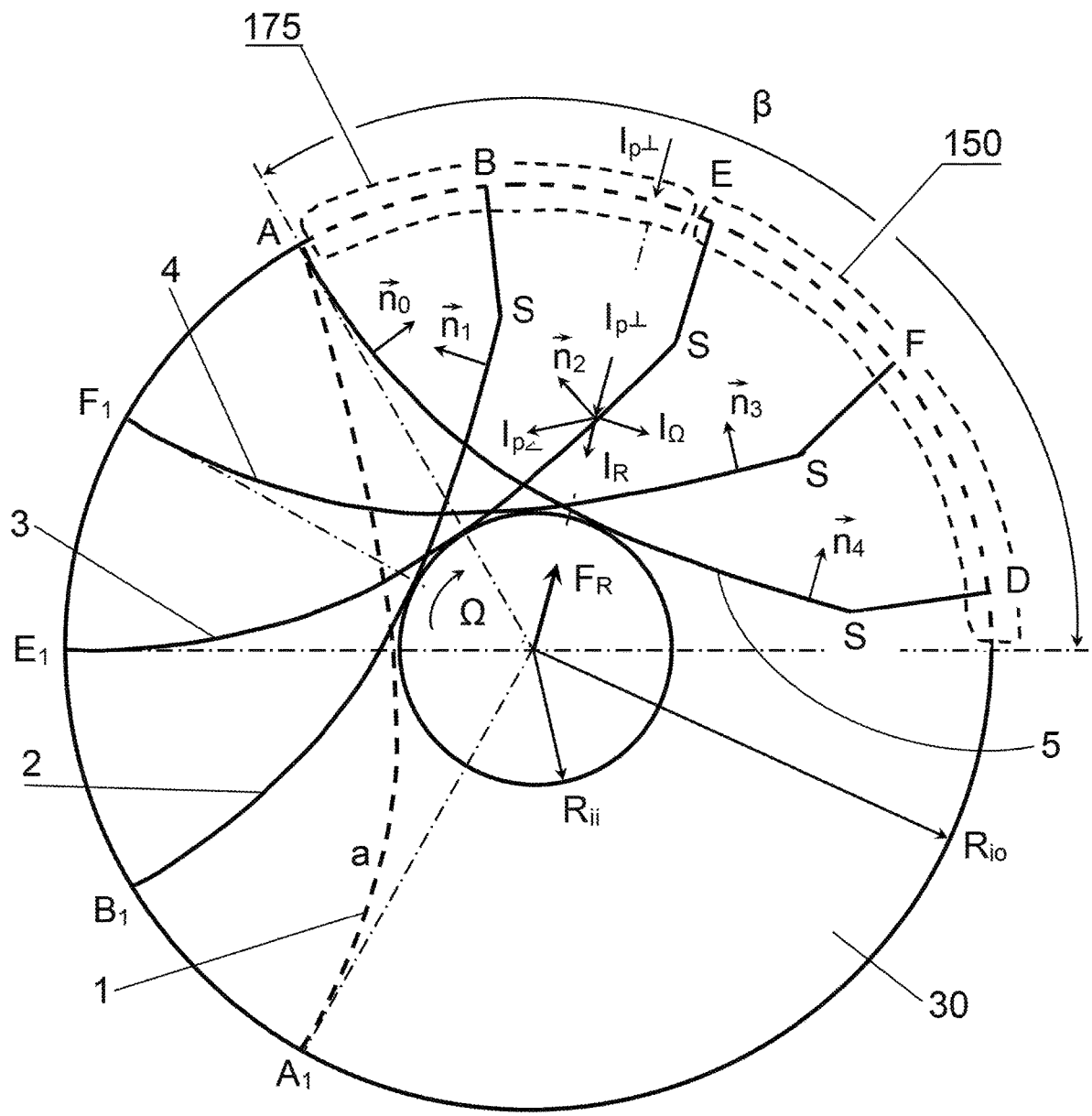
FIG. 5 is a cross-sectional view of the inner movable cylindrical element, rotating with an instantaneous "frozen" position of the dynamic reflector of pressure impulse and stiffener rib; wherein the common dynamic surface is increased from zero to maximum.

The dynamic reflector of pressure impulse 40, in FIG. 3, is configured in the inner movable cylindrical solid wall of the inner movable cylindrical element 30 whose longitudinal three-dimensional surface has a radially-azimuthal variable concave curvature 41, obtained as a result of a subtracting from a volume of the solid wall of the inner cylinder a volume of a longitudinal truncated cylinder segment, limited by the outer radius of the outer cylindrical surface, a face of the longitudinal radially-azimuthal concave surface, a face of the longitudinal radially-azimuthal surface, and a surface of curvilinear circular segment limited by the azimuthal angle β, in FIG. 5. The surface of the dynamic reflector of pressure impulse 40 longitudinally is limited by the end cap 28, (FIG. 1) and by a stiffener rib 45 (FIG. 3). The stiffener rib 45 axially-azimuthally divides the surface of the cross-sectional opening in the inner movable cylindrical solid wall of the inner movable cylindrical element 50 from the surface of the dynamic reflector of pressure impulse 40. A height of the stiffener rib 45 does not exceed an outer radius of the inner movable cylindrical solid wall of the inner movable cylindrical element. An axial-azimuthal shape of the stiffener rib 45 coincides with an axial-azimuthal side of the shape of the surface of the profiled cross-sectional opening 50. A radial-azimuthal variable concave curvature 41 depends on the radiuses of the inner $R_{ii}$ and $R_{io}$, (FIG. 1) and the outer $R_{oi}$ and $R_{oo}$, (FIG. 2) of cylindrical surfaces and of the profiles of the surfaces of the cross-sectional openings 50 and 35 in the solid walls. The surface of dynamic reflector of_pressure impulse 40 provides a reflection of the incident pressure impulse during the intersecting with the surface of cross-sectional opening 35 in the solid wall of the outer fixed cylindrical element 20, while the inner movable cylindrical element is rotating relatively to outer fixed cylindrical element in the unambiguous direction. A mechanical reaction of the surface of the dynamic reflector of pressure impulse 40 on the reflected pressure impulse is decomposed to radial and azimuthal components. A value of each component depends on the radial-azimuthal concave curvature of the surface of dynamic reflector of pressure impulse, inside the whole angle β. The decomposition is carrying out in such a way that provides a minimal value of a radial component of the mechanical reaction on the shaft of the pressure wave generator 27 and a maximum value of an azimuthal component of a mechanical reaction on the surface of dynamic reflector of pressure impulse.

Generating pressure waves by the use of pressure wave generator with dynamic reflector of pressure impulse, according to the present invention, is carrying out in the following manner.

With a further increase in the common surface $S_s(t)$, the dynamic common surface becomes greater than zero, $S_d(t)>0$. Dynamics of the incident and reflected pressure impulse from the rotating concave surface of the dynamic reflector of pressure impulse is significantly changed, in comparison with a reflected impulse from the cylindrical surface. The quantity and direction of the resulting impulse in the inter-cylindrical volume and in the collector volume are changed. Therefore, radial and azimuthal components of the reflected pressure impulse also change.

Figure 6:
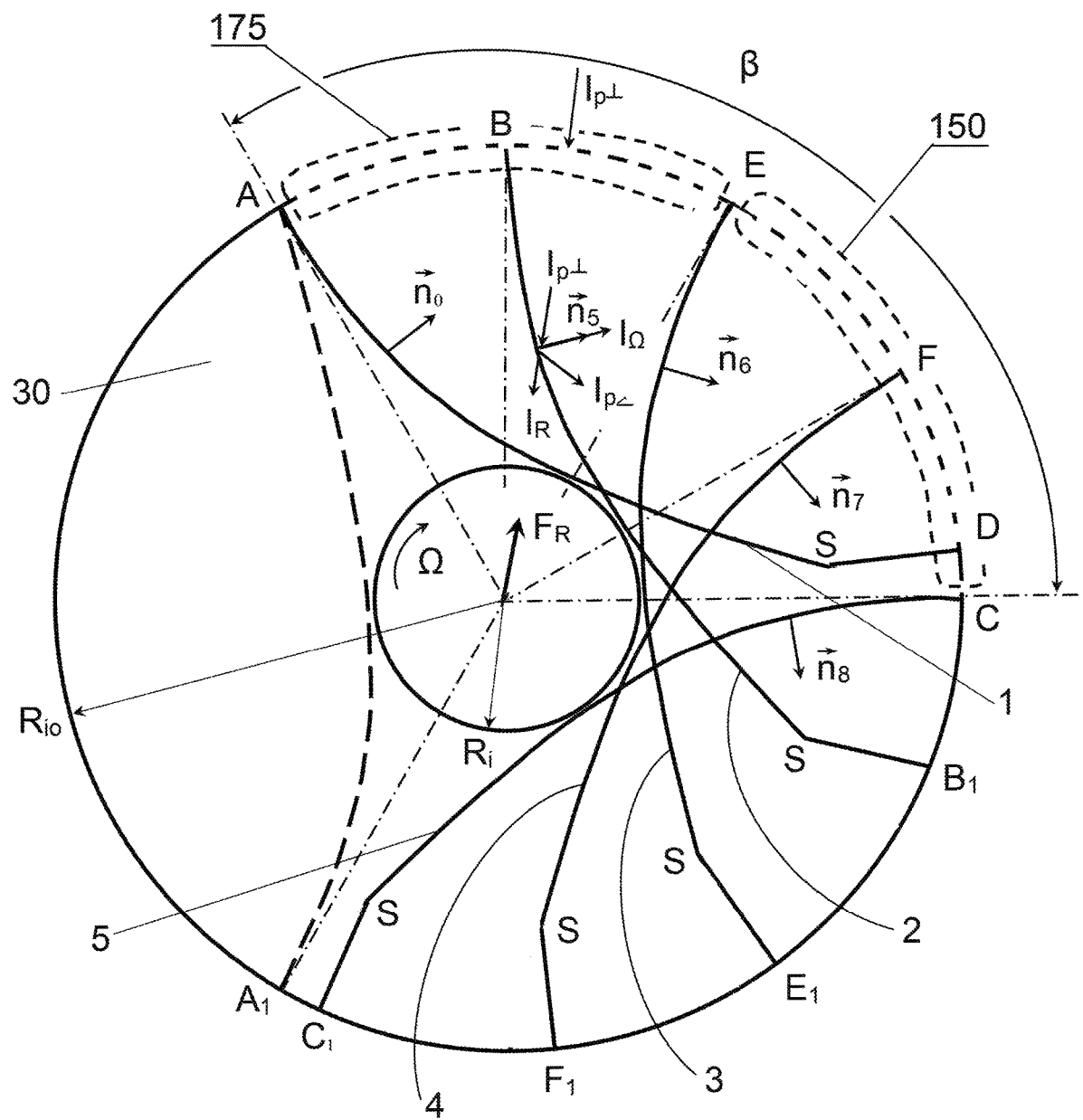
FIG. 6 is a cross-sectional view of the inner movable cylindrical element, rotating with an instantaneous "frozen" position of the dynamic reflector of pressure impulse and stiffener rib. The common dynamic surface is decreased from maximum to zero.

For simplified explanation of the function of dynamic reflector of pressure impulse consider process of generating asymmetrical pressure wave of the drop-shaped form. Suppose, that $t_F/T=\frac{1}{3}$ and the surface of the cross-sectional opening in the solid wall of the fixed cylindrical element is enclosed by the azimuthal angle $\alpha=2*\pi/3$, and α=β. Consider cases, when the dynamic common surface $S_d(t)$ is increased from zero to maximum (FIG. 5) in the time interval $\Delta t=T/3$ and angle range $\beta=2*\pi/3$ and is decreased in the same time interval and angle range (FIG. 6). Note, that in FIGS. 5 and 6 there are not shown the cross-sectional opening 35 in the solid wall of the outer fixed cylindrical element. Only zones of the common surface 150, $S_i(t)$ and of the dynamic common surface 175, $S_d(t)$ are marked. $n_0$, $n_1, n_2, \ldots, n_8$ are the local unit vectors perpendicular to corresponding surfaces. At the initial time, t=0 the azimuthal position of the surface of dynamic reflector of pressure impulse is $A_1aA$ (FIG. 5). In this case, the dynamic common surface $S_d(t=)=0$, $S_s(t_F)$=maximum. When rotating the inner cylinder with the angular velocity Ω, during the time interval $\Delta t=T/12$, surface of the dynamic reflector of pressure impulse is rotated at the angle $\Delta\varphi=(2*\pi)/12$ and takes the azimuthal instantaneous position $B_1S$. Radial sectors SB, SE, SF, SD corresponds to a part of the stiffener rib 45 (FIG. 2). Let us further consider the rotating of this rigid instantaneous azimuthal position of the dynamic reflector of pressure impulse and stiffener rib. After each angle interval Δφ it corresponds to azimuthal positions $E_1SE$, $F_1SF$, ASD. A partial decomposition on the components of the incident pressure impulse in the point with a normal vector $n_2$ in the position $E_1SE$ is presented. $I_P$ is the reflected impulse, $I_R$ is the radial component of the reflected impulse, $I_\Omega$ is the azimuthal component of the impulse, impulse transmitted to particle by rotating surface of dynamic reflector of pressure impulse, r is the current radius. The rotation of dynamic reflector of pressure impulse reduces all components of the reflected pressure impulse. It is clearly, from FIG. 5, that the mechanical reaction $F_r$ of the inner cylinder to the reflected pressure impulse $I_p⦝$ from the rotating concave surface of the dynamic reflector of pressure impulse is significantly smaller than from the cylindrical surface. FIG. 6 shows a further rotation of the rigid structure of a dynamic reflector of pressure impulse and stiffener rib on the time interval $\Delta t=T/3 \ldots 2T/3$ and angle interval $2\pi/3 \ldots 4\pi/3$. At time t equals to T/3, the dynamic common surface takes a maximum value. At time t is equal to 2T/3, $S_d=0$. The initial azimuthal position of the surface of dynamic reflector of pressure impulse is ASD. The next intermediate positions are: $BSB_1$, $ESE_1$, $FSF_1$. The final position of the surface is $CSC_1$. It corresponds to moment of time t=2T/3. The partial decomposition of the of the reflected pressure impulse in the point with the normal vector $n_5$ is presented in the surface position $BSB_1$. The radial component of reflected impulse $I_p$ ∠ is much less, than from the cylindrical surface; because the incident angle of pressure impulse is small. The azimuthal component is slightly increased due to cylinder rotation. However, in general on the whole surface the positive and negative rotational moments are acting. Positive moment coincides with the direction of rotation of the cylinder and pushes it in the direction of rotation while the negative moment is slightly resisting to its rotation. A simple radial-azimuthal manipulation of the curvature of concave surface 41 allows the obtaining positive average value of the rotational moment.

These qualitative explanations with using the rotating instantaneous position of the dynamic reflector of pressure impulse 40 and stiffener rib 45 gives the well physical picture of the importance of dynamic reflector of pressure impulse in the process of generating pressure waves. Decomposition of the reflected pressure impulse by the concave surface 41 provides maximal azimuthal and minimal radial components of mechanical action on the shaft of the pressure wave generator.

The invention claimed is:

1. A pressure wave generator with a dynamic reflector of pressure impulse
is provided, comprising:
   a controlled drive;
   a first pipe;
   a first housing, having the form of an outer fixed cylindrical element, further comprising an outer fixed cylindrical solid wall having a length, an inner cylindrical surface with an inner radius and an outer cylindrical surface with an outer radius, a longitudinal axis of symmetry, a first end and a second end, a first end cap and a second end cap, a cross-sectional opening in the cylindrical solid wall, of a given profile shape, size and single-position location limited by the azimuthal angle α, an inner cavity having a volume and a longitudinal axis of symmetry; the cylindrical solid wall being rigidly connected at the first end and at the second end each to one of the first end cap and the second end cap, the first and second end caps each being in the form of a round disc and each being situated perpendicularly to the longitudinal axis of symmetry
   a collector, having a first end and a first cross-sectional area and a second end and a second cross-sectional area, an inner cavity having a volume, the first end being installed on the outer surface of the outer fixed cylindrical solid wall, the first cross-sectional area encloses the cross-sectional opening in the outer cylindrical solid wall, the second end being connected to a first pipe comprising an inner cavity having a volume, the collector, whose volume of the inner cavity together with the volume of the inner cavity of the outer fixed cylindrical element and with the volume of the first pipe, forming a first volume filled with a fluid exposed to over pressure;
   a second housing, comprising an inner movable cylindrical element, comprising an inner movable cylindrical solid wall, having a length, an inner cylindrical surface with an inner radius and an outer cylindrical surface with an outer radius an inner cavity having a volume, a cross-sectional opening in the solid wall, of a given profile shape, size and a single-position location limited by the azimuthal angle γ, a first end and a second end, concentrically located in the inner cavity of the outer fixed cylindrical element, forming a thin gap between the inner cylindrical surface of the outer fixed cylindrical solid wall and the outer cylindrical surface of the inner movable cylindrical solid wall, a third end cap and a fourth end cap, the inner movable cylinder solid wall being rigidly connected, at the first end to the third end cap and at the second end to the fourth end cap, the third end cap having a cross-sectional opening therethrough such that the third end cap is connected to a second pipe comprising an inner cavity having a volume; the inner cavity of the inner movable cylindrical element and the inner cavity of the second pipe forming a second volume filled with fluid and exposed to under pressure;
   a shaft of the pressure wave generator, having an axis of rotation coinciding with the longitudinal axis of symmetry of the outer fixed cylindrical solid wall, rigidly connected to the end caps of the inner movable cylindrical solid wall;
   wherein, a single-position location of the surfaces of cross-sectional openings in the outer fixed cylindrical solid wall of the outer fixed cylindrical element and in the inner movable cylindrical solid wall of the inner cylindrical element are such, that during the rotating of the inner movable cylindrical element relatively to outer fixed cylindrical element, by the shaft of the pressure wave generator, there is created a periodic intersection of the surfaces of the cross-sectional openings that forms a common open surface between the first housing and the second housing;
   a dynamic reflector of pressure impulse, configured in the inner movable cylindrical solid wall, comprising a longitudinal three-dimensional surface having a radially-azimuthal variable concave curvature, obtained as a result of a subtracting from a volume of the inner movable cylindrical solid wall a volume of a longitudinal truncated cylindrical segment, limited by the outer radius of the outer cylindrical surface of the inner movable cylindrical solid wall, a face of the longitudinal radial-azimuthal convex surface, a face of the longitudinal radial-azimuthal surface, and a surface of the curvilinear circular segment limited by the azimuthal angle β, located longitudinally between the fourth end cap and the surface of cross-sectional opening and additionally the radial-azimuthal variable curvature depends on the length and of the radiuses of the inner cylindrical surface and of the outer cylindrical surface of the inner movable cylindrical solid wall and of the length and of the radiuses of the inner cylindrical surface and of the outer cylindrical surface of the outer fixed cylindrical solid wall and of the profiles of the surfaces of the openings in the inner movable cylindrical solid wall and the outer fixed cylindrical solid wall which provides a reflection of the pressure impulse incident to the concave surface during the intersecting with the surface of cross-sectional opening in the outer fixed cylindrical solid wall of the outer fixed cylindrical element while the inner movable cylindrical element is rotating relatively to outer fixed cylindrical element in the unambiguous direction and besides a mechanical reaction of the concave surface on a reflected pressure impulse is decomposed in such a way inside the whole angle β, that provides a minimal value of a radial component of the mechanical reaction on the shaft of the pressure wave generator and a maximum value of the azimuthal component of the mechanical reaction on the shaft of the pressure wave generator;

a stiffener rib configured in the inner movable cylindrical solid wall of the inner movable cylindrical element, axially located between the third end cap and the fourth end cap, axially-azimuthally dividing the surface of the cross-sectional opening in the inner movable cylindrical solid wall of the inner movable cylindrical element from the surface of the dynamic reflector of pressure impulse, whose radial height does not exceed an outer radius of the outer cylindrical surface of the inner movable cylindrical solid wall and an axially-azimuthal shape coincides with an axially-azimuthal shape of a side of the surface of the cross-sectional opening.

2. The pressure wave generator with dynamic reflector of pressure impulse as defined in claim 1, wherein the inner surface of the collector is carried out in the form of helix.

3. The pressure wave generator with dynamic reflector of pressure impulse as defined in claim 1, wherein the azimuthal angle $\beta$ of the concave surface of the dynamic reflector of pressure impulse and the azimuthal angle $\alpha$ satisfies the condition: $\beta/\alpha \leq 1$.

4. The pressure wave generator with dynamic reflector of pressure impulse as defined in claim 1, wherein the azimuthal angle $\alpha$ and the azimuthal angle $\gamma$ satisfies the condition: $\gamma/\alpha > 1$.

* * * * *